(12) United States Patent
Sauvonnet et al.

(10) Patent No.: US 6,834,904 B2
(45) Date of Patent: Dec. 28, 2004

(54) FOOTREST FOR MOTOR VEHICLE

(75) Inventors: Franck Sauvonnet, Fontenay sous Bois (FR); Brian N. Orr, Chesterfield Township, MI (US); Waldemar W. Gmurowski, Sterling Heights, MI (US)

(73) Assignees: Peugeot Citroën Automobiles SA, Neuilly sur Seine (FR); Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/297,032

(22) PCT Filed: Feb. 18, 2002

(86) PCT No.: PCT/FR02/00606
§ 371 (c)(1),
(2), (4) Date: Nov. 27, 2002

(87) PCT Pub. No.: WO02/067073
PCT Pub. Date: Aug. 29, 2002

(65) Prior Publication Data
US 2003/0127882 A1 Jul. 10, 2003

(30) Foreign Application Priority Data
Feb. 19, 2001 (FR) .......................... 01 02218

(51) Int. Cl.[7] .............................. B62J 25/00
(52) U.S. Cl. ........................................ 296/75
(58) Field of Search ............... 296/75; 74/512, 74/513; 297/423.1, 423.19; 180/331

(56) References Cited

U.S. PATENT DOCUMENTS

| | | | |
|---|---|---|---|
| 3,059,960 A | 10/1962 | Komorowski et al. | |
| 3,511,109 A | 5/1970 | Tanaka | |
| 5,078,024 A | 1/1992 | Cicotte et al. | |
| 5,183,308 A * | 2/1993 | Koga et al. | 296/75 |
| 5,771,752 A | 6/1998 | Cicotte | |
| 6,073,515 A * | 6/2000 | Elton et al. | 296/75 |
| 6,151,985 A | 11/2000 | Garber et al. | |
| 6,189,409 B1 | 2/2001 | Neag et al. | |
| 6,314,831 B2 * | 11/2001 | Rixon et al. | 74/512 |
| 6,360,629 B2 | 3/2002 | Schambre et al. | |
| 6,364,047 B1 * | 4/2002 | Bortolon | 180/334 |
| 6,367,348 B1 | 4/2002 | Toelke et al. | |
| 6,450,061 B1 | 9/2002 | Chapman et al. | |
| 6,510,761 B2 * | 1/2003 | Zhang et al. | 74/512 |
| 6,527,327 B2 * | 3/2003 | Gaus et al. | 296/75 |
| 6,584,871 B2 | 7/2003 | Burton et al. | |
| 2002/0157497 A1 * | 10/2002 | Porter et al. | 74/512 |
| 2003/0094070 A1 * | 5/2003 | O'Neill | 74/560 |

FOREIGN PATENT DOCUMENTS

| | | |
|---|---|---|
| DE | 19916812 | 9/1999 |
| EP | 0353958 | 2/1990 |
| EP | 0410815 | 1/1991 |
| GB | 1278919 | 6/1972 |
| JP | 410297345 A * | 11/1998 |
| KR | 99034614 A * | 5/1999 |
| WO | WO/0073099 | 12/2000 |

* cited by examiner

Primary Examiner—Jason Morrow
(74) Attorney, Agent, or Firm—Gary M. Cohen

(57) ABSTRACT

An adjustable footrest (1) is connected to the floor of a vehicle, in particular, a motor vehicle, and includes a framework structure (2) having at least one panel (23) which is inclined toward the front of the vehicle, for accommodating the foot of a driver. A drive mechanism (3) for causing linear displacement along the axis of the vehicle is fixed to the rear of the panel (23), and to the floor, for moving the framework structure (2).

17 Claims, 1 Drawing Sheet

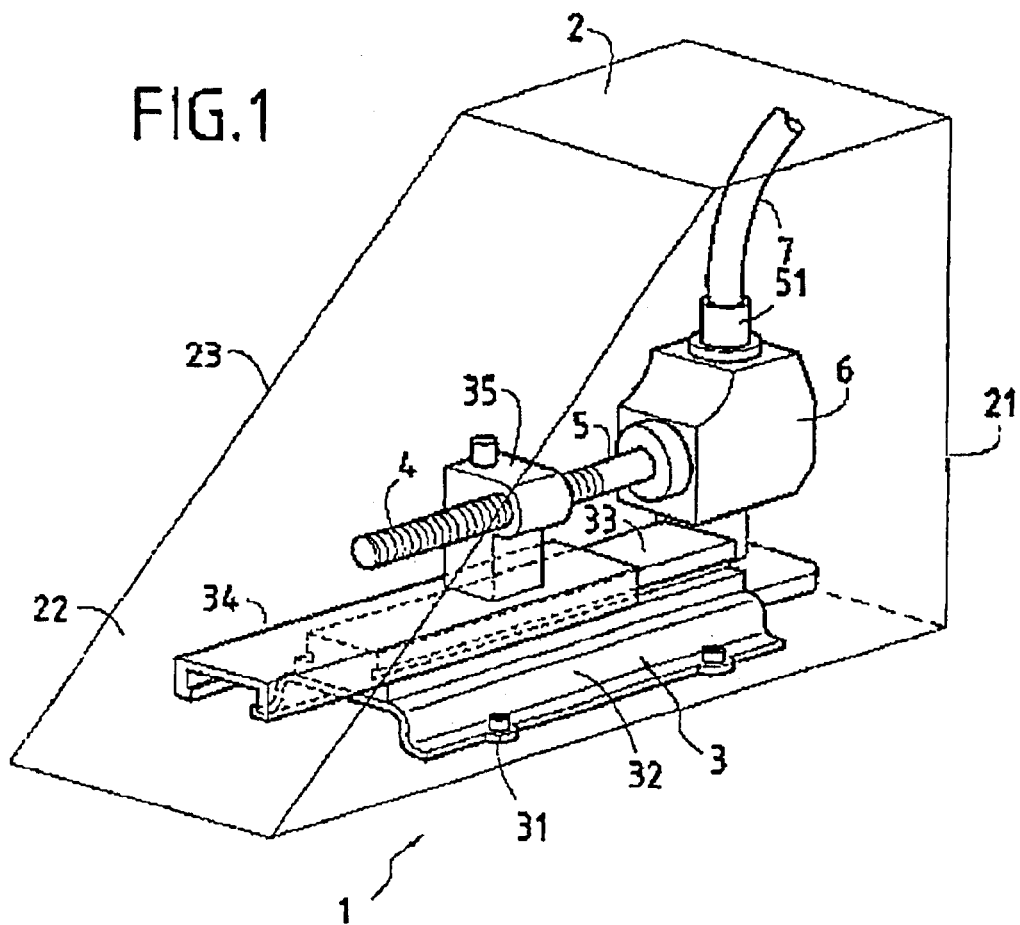
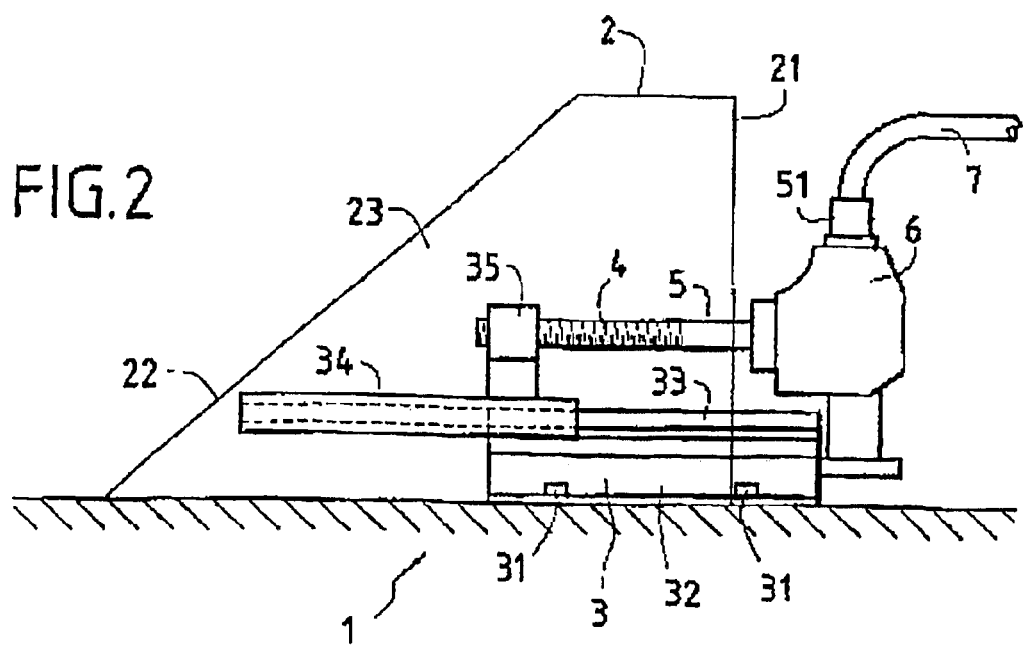

FOOTREST FOR MOTOR VEHICLE

BACKGROUND OF THE INVENTION

The present invention relates to an adjustable footrest connected to a floor structure of a vehicle.

It is known practice for adjustable pedalboxes to be fitted in motor vehicles equipped with automatic gearboxes. The term "adjustable" means that all or part of the pedalbox can be moved closer to or away from the driver's seat in a longitudinal direction so that it is possible to tailor the position of at least part of the pedalbox to the position of the driver's seat, and therefore, to the driver's size.

In particular, adjustable footrests for receiving the left foot of a driver are known. Such footrests can be translated along the longitudinal axis of the motor vehicle to adapt to the position desired by the driver. Known footrests are connected to the floor of a vehicle, in particular, a motor vehicle, and comprise a framework structure having at least one face which is intended to accommodate the foot of a driver and which is inclined toward the front of the vehicle. A mechanism is fixed to the rear of the framework structure, for moving the face. This face-moving mechanism is itself fixed to the floor of the vehicle.

Such currently-known, adjustable footrests are not entirety satisfactory because they do not allow the driver's free leg, which is not exerting any force on the accelerator pedal, to adopt a suitable position.

SUMMARY OF THE INVENTION

The object of the present invention is therefore to provide an adjustable footrest which allows the driver of a motor vehicle to position the driver's leg in a suitable position, irrespective of the driver's size, and to provide a motor vehicle which incorporates such a footrest.

To achieve this, the present invention provides an adjustable footrest which is connected to the floor of a vehicle, in particular, a motor vehicle, and which comprises a framework structure including a panel having at least one face which is intended to accommodate the foot of a driver and which is inclined toward the front of the vehicle. A drive mechanism is fixed to the rear of the panel, for moving the face. The drive mechanism is itself fixed to the floor of the vehicle, and is configured for linear displacement along the axis of the vehicle.

Advantageously, the drive mechanism is comprised of a slide and a reduction gearbox designed to move a female part of the slide. The reduction gearbox is preferably fixed to a male part of the slide, and the male part of the slide is preferably fixed to the floor of the vehicle. As a further preference, the terminal part of the output shaft extending from the reduction gearbox is a worm designed to transmit rotary movement to a nut connected to the female part of the slide.

Other advantages and features of the present invention will become better apparent from the detailed description provided below, with reference to the following illustrations.

BRIEF DESCRIPTION OF THE DRAWINGS

FIG. 1 is a perspective view of the footrest of the present invention, installed in a motor vehicle and in an extreme retracted position.

FIG. 2 is a longitudinal cross-sectional view of the footrest of the present invention, installed in the motor vehicle and in an extreme deployed position.

DETAILED DESCRIPTION OF THE INVENTION

FIG. 1 shows an adjustable footrest 1 produced in accordance with the present invention. The adjustable footrest 1 includes a framework structure 2 fixed to portions of the bulkhead of a vehicle, as is shown in FIG. 2. The framework structure 2 includes a parallelepipedal part 21 directed toward the cabin of the vehicle and toward the floor of the vehicle, and a part 22 having an inclined panel 23 which rests on the floor of the vehicle, as is shown in FIG. 2.

The panel 23, which is inclined toward the front of the vehicle, is intended to accommodate the foot of a driver which is not operating the vehicle's clutch pedal. A drive mechanism 3 is provided behind the panel 23, for linear movement of the framework structure 2 along the longitudinal axis of the motor vehicle.

The base of the drive mechanism 3 is fixed to the floor of the vehicle by screws 31, and includes a support piece 32. The upper part of the support piece 32 is machined to form the male part 33 of a slide on which a mating shape (the female part 34) can slide. One end of the female part 34 of the slide is fixed to the panel 23. Welded to the opposite end of the female part 34 is a nut 35. A worm 4 constituting the terminal part of an output shaft 5 of an angled reduction gearbox 6 slides within the nut 35 so as to transmit the rotary movement of the output shaft 5 to the nut 35 connected to the female part 34 of the slide. The reduction gearbox 6 is controlled by an electric motor (not shown) through a transmission cable 7 connected to the input take-off 51.

The way in which the above-described device works is as follows. When the driver of the vehicle wishes to move the footrest 1 forward or backward with respect to the driver's seat, to optimize the driver's position, the electric motor is operated, in a manner which is per se known, for example, using an adjustment button. This causes the reduction gearbox 6 to rotate the shaft 5, in one direction or the other, and within the nut 35. This then causes the female part 34 of the slide to move, within the male part 33, causing the framework structure 2 to translate.

Such translational movement of the framework structure 2 makes it possible to satisfactorily provide a footrest which is adjustable according to the size of the driver, allowing good posture in a driving position which is improved, as appropriate, in conjunction with movements of the seat, angling of the backrest, and movements of the steering wheel.

What is claimed is:

1. An adjustable footrest for a vehicle having a floor, for receiving and supporting a foot of a driver operating the vehicle, comprising:

a frame having a panel facing toward the driver, for receiving and supporting the foot of the driver, wherein the panel is coupled with front portions of the frame, and wherein the panel is inclined toward front portions of the vehicle; and a drive mechanism fixed to the floor of the vehicle and coupled with rear portions of the panel, wherein the drive mechanism is coupled with the rear portions of the panel for linear displacement of the frame and the panel along a longitudinal axis defined by the vehicle, and wherein the drive mechanism includes a slide coupled with the rear portions of the panel, and a reduction gearbox coupled with the slide for movement of the slide along the longitudinal axis defined by the vehicle.

2. The adjustable footrest of claim 1 wherein the vehicle is a motor vehicle.

3. The adjustable footrest of claim 1 wherein the slide is coupled with a support plate, and wherein the reduction gearbox is fixed to the support plate.

4. The adjustable footrest of claim 3 wherein the slide forms a female part of the drive mechanism and the support plate forms a male part of the drive mechanism.

5. The adjustable footrest of claim 3 wherein the reduction gearbox has an output shaft, and wherein terminal portions of the output shaft include a worm for transmitting rotary movement to a nut connected to the slide.

6. The adjustable footrest of claim 3 wherein the support plate is fixed to the floor of the vehicle.

7. The adjustable footrest of claim 6 wherein the frame encloses at least portions of the drive mechanism.

8. The adjustable footrest of claim 7 wherein portions of the frame form a parallelepiped.

9. The adjustable footrest of claim 6 wherein portions of the frame rest on the floor of the vehicle.

10. A motor vehicle having a floor, and an adjustable footrest coupled with the floor of the vehicle, for receiving and supporting a foot of a driver operating the vehicle, wherein the adjustable footrest comprises:

a frame having a panel facing toward the driver, for receiving and supporting the foot of the driver, wherein the panel is coupled with front portions of the frame, and wherein the panel is inclined toward front portions of the vehicle; and a drive mechanism fixed to the floor of the vehicle and coupled with rear portions of the panel, wherein the drive mechanism is coupled with the rear portions of the panel for linear displacement of the frame and the panel along a longitudinal axis defined by the vehicle, and wherein the drive mechanism includes a slide coupled with the rear portions of the panel, and a reduction gearbox coupled with the slide for movement of the slide along the longitudinal axis defined by the vehicle.

11. The motor vehicle of claim 10 wherein the slide is coupled with a support plate, and wherein the reduction gearbox is fixed to the support plate.

12. The motor vehicle of claim 11 wherein the slide forms a female part of the drive mechanism and the support plate forms a male part of the drive mechanism.

13. The motor vehicle of claim 11 wherein the reduction gearbox has an output shaft, and wherein terminal portions of the output shaft include a worm for transmitting rotary movement to a nut connected to the slide.

14. The motor vehicle of claim 11 wherein the support plate is fixed to the floor of the vehicle.

15. The motor vehicle of claim 14 wherein the frame encloses at least portions of the drive mechanism.

16. The motor vehicle of claim 15 wherein portions of the frame form a parallelepiped.

17. The motor vehicle of claim 14 wherein portions of the frame rest on the floor of the vehicle.

* * * * *